US011295295B2

(12) United States Patent
Borucki et al.

(10) Patent No.: US 11,295,295 B2
(45) Date of Patent: Apr. 5, 2022

(54) DYNAMIC MOBILE WALLET ITEMS

(71) Applicant: NCR Corporation, Duluth, GA (US)

(72) Inventors: Robert Thomas Borucki, Mesa, AZ (US); Richard T. Davidson, Edinburgh (GB); Craig Derek Russell, Cowdenbeath (GB)

(73) Assignee: NCR Corporation, Atlanta, GA (US)

( * ) Notice: Subject to any disclaimer, the term of this patent is extended or adjusted under 35 U.S.C. 154(b) by 588 days.

(21) Appl. No.: 15/141,966

(22) Filed: Apr. 29, 2016

(65) Prior Publication Data

US 2017/0316403 A1 Nov. 2, 2017

(51) Int. Cl.
*G06Q 20/00* (2012.01)
*G06Q 20/36* (2012.01)
*G06Q 20/32* (2012.01)
*G06F 16/93* (2019.01)
*G06Q 10/02* (2012.01)
*G06Q 20/04* (2012.01)

(52) U.S. Cl.
CPC ........... *G06Q 20/367* (2013.01); *G06F 16/93* (2019.01); *G06Q 10/02* (2013.01); *G06Q 20/0457* (2013.01); *G06Q 20/32* (2013.01); *G06Q 20/3274* (2013.01); *G06Q 20/36* (2013.01)

(58) Field of Classification Search
CPC ........... G06Q 2220/00; G06Q 2220/10; G06Q 2220/16; G06Q 20/367; G06Q 20/36; G06Q 10/02; G06Q 20/0457; G06Q 20/3274; G06Q 20/32; G06F 16/93; H04L 67/06; H04L 67/34
USPC ................................ 705/16, 21; 380/44, 262
See application file for complete search history.

(56) References Cited

U.S. PATENT DOCUMENTS

| | | | | |
|---|---|---|---|---|
| 6,023,698 | A | * | 2/2000 | Lavey, Jr ............ H04L 12/2856 |
| 2002/0060246 | A1 | * | 5/2002 | Gobburu ................ G06Q 20/04 235/462.46 |
| 2003/0191719 | A1 | * | 10/2003 | Ginter ..................... G06F 21/10 705/54 |

(Continued)

OTHER PUBLICATIONS

Lefebvre, Rob: "Mastering Passbook on Your iPhone [Feature]", cultofmac.com, May 11, 2013 (May 11, 2013), XP055383529, Retrieved from the Internet: URL:https://web.archive.org/web/20130513165641/http://www.cultofmac.com/227022/mastering-passbook-on-your-iphone-feature/ [retrieved on Jun. 21, 2017] * the whole document *.

*Primary Examiner* — Dante Ravetti
(74) *Attorney, Agent, or Firm* — Schwegman, Lundberg & Woessner

(57) ABSTRACT

Various embodiments herein each include at least one of systems, methods, and software for dynamic mobile wallet items. One embodiment in the form of a method includes receiving, via a network, a dynamic mobile document request associated with a registered user and including a token associated with data to be included in the dynamic mobile document. The method may then retrieve data for the dynamic mobile document from a database based at least in part on the token and an identifier of the registered user and then continue by transmitting, via the network, the retrieved dynamic mobile document data and data indicating how the dynamic mobile document is to be provided to the registered user to a dynamic mobile document generation service, the dynamic mobile document generation service to generate and provide the dynamic mobile document to the registered user.

4 Claims, 6 Drawing Sheets

(56) References Cited

U.S. PATENT DOCUMENTS

| | | | |
|---|---|---|---|
| 2005/0070257 A1* | 3/2005 | Saarinen | H04L 67/22 |
| | | | 455/414.1 |
| 2009/0125429 A1* | 5/2009 | Takayama | G06Q 20/327 |
| | | | 705/35 |
| 2013/0332826 A1* | 12/2013 | Karunamuni | G06F 17/27 |
| | | | 715/273 |
| 2014/0214640 A1* | 7/2014 | Mallikarjunan | G06Q 20/36 |
| | | | 705/35 |
| 2014/0256357 A1 | 9/2014 | Wang | |
| 2015/0074774 A1* | 3/2015 | Nema | H04L 63/08 |
| | | | 726/5 |
| 2015/0150110 A1* | 5/2015 | Canning | H04L 63/0807 |
| | | | 726/9 |
| 2015/0199736 A1* | 7/2015 | Chang | G06Q 30/0601 |
| | | | 705/26.1 |
| 2018/0184250 A1* | 6/2018 | Barrett | H04L 9/3213 |

* cited by examiner

DYNAMIC MOBILE WALLET ITEMS

BACKGROUND INFORMATION

Consumers have the option to receive coupons, tickets, vouchers, and passes as barcodes on their mobile devices. These mobile barcodes provide convenience to the consumer. A wallet is a mobile application that enables mobile tickets, mobile documents, coupons, vouchers, and the like to be delivered and stored locally on the device itself. This device repository enables items to be located easily on a mobile device and opened-up for scanning without requiring a data connection. Travelers in locations where data connections are unavailable or inconvenient may prefer the wallet for its ability to store barcodes onboard for convenient retrieval.

SUMMARY

Various embodiments herein each include at least one of systems, methods, and software for dynamic mobile wallet items. One embodiment in the form of a method includes receiving, via a network, a dynamic mobile document request associated with a registered user and including a token associated with data to be included in the dynamic mobile document. The method may then retrieve data for the dynamic mobile document from a database based at least in part on the token and an identifier of the registered user. The method then continues by transmitting, via the network, the retrieved dynamic mobile document data and data indicating how the dynamic mobile document is to be provided to the registered user to a dynamic mobile document generation service. The dynamic mobile document generation service then generates and provides the dynamic mobile document to the registered user.

Another method embodiment, such as may be performed by a dynamic mobile document generation service, includes receiving, via a network from a data source, a dynamic mobile document generation request including data identifying a transmission mode for transmitting a dynamic mobile document to be generated, a network identifier of where to send the generated dynamic mobile document, and at least one data item to be included in the dynamic mobile document when generated and to uniquely identify the dynamic mobile document. This method then stores data of the dynamic mobile document generation request in a database and generates the dynamic mobile document including the at least one data item and metadata defining the at least one item as a dynamic data item within the generated dynamic mobile document. This method may then proceed by transmitting, via the network, the generated dynamic mobile document according to the identified transmission mode to a network destination of the network identifier.

Yet another embodiment, in the form of a system, includes at least one computer processor, at least one memory device, and at least one network interface device. The system of this embodiment also includes a database under management by a database management system stored on the at least one memory device or accessible via that at least one network interface device. The database stores dynamic mobile document data received from at least one data source. The system further includes a dynamic mobile document generation module stored in the at least one memory device and executable by the at least one processor to perform data processing activities. The data processing activities of the dynamic document generation module include receiving, via the at least one network interface device from the at least one data source, a dynamic mobile document generation request including data identifying a transmission mode for transmitting a dynamic mobile document to be generated, a network identifier of where to send the generated dynamic mobile document, and at least one data item to be included in the dynamic mobile document when generated and to uniquely identify the dynamic mobile document. These data processing activities also include storing data of the dynamic mobile document generation request in the database and generating the dynamic mobile document including the at least one data item and metadata defining the at least one item as a dynamic data item within the generated dynamic mobile document. The data processing activities additionally include transmitting, via the at least one network interface device, the generated dynamic mobile document according to the identified transmission mode to a network destination of the network identifier.

DETAILED DESCRIPTION

Figure 1:
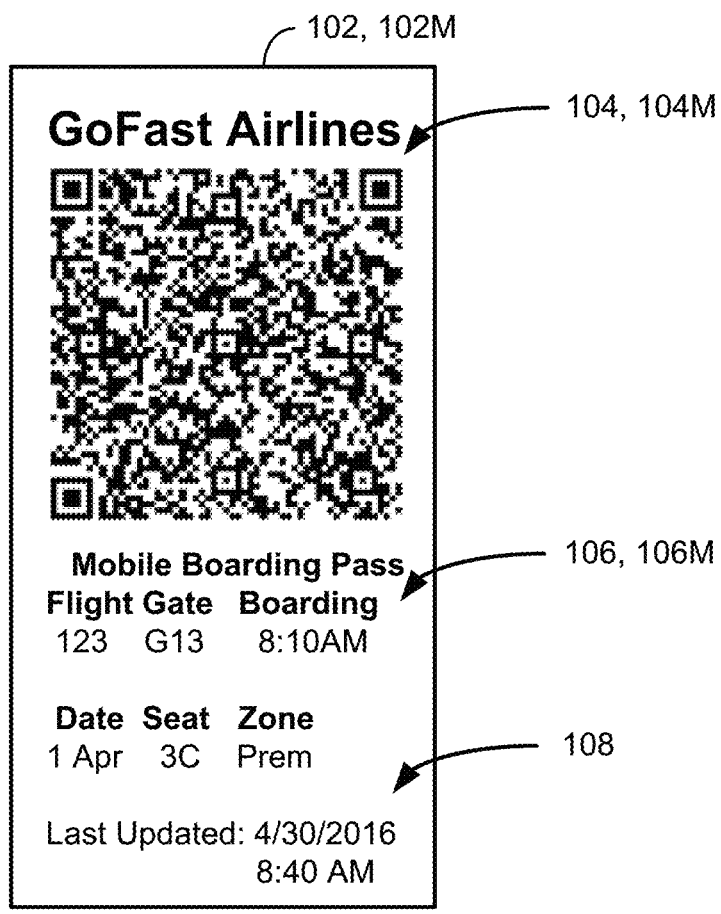
FIG. 1 illustrates a mobile wallet item, according to an example embodiment.

Various embodiments herein each include at least one of systems, methods, software, and data structures for dynamic mobile wallet items. Mobile wallet items, which are a form of mobile documents, typically include barcodes and are used for airline boarding passes, movie and event tickets, mobile documents, coupons, vouchers, and the like that are delivered to and stored locally on a mobile device itself. When delivered to a consumer mobile device, the mobile wallet item normally consists of more than just the barcode. For instance, a company logo and some clear text information may be displayed. To date, the elements of a mobile wallet item have generally been static. The various embodiments herein make one or more of the elements of a mobile wallet item dynamic, for example to allow for flight status change updates to airline boarding passes, theater or venue changes for movie and event tickets, and other changes that are relevant in the context of a specific mobile wallet item type. Some such embodiments include updating mobile wallet item elements stored on a mobile device, while other embodiments include retrieving or receiving a new copy or version of the mobile wallet item that has been updated on a server. Other embodiments may include a combination of such updating techniques.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 illustrates a mobile wallet item 102, according to an example embodiment. The mobile wallet item 102 is one example embodiment of a dynamic mobile document as also referred to herein. The illustrated mobile wallet item 102 is an airline boarding pass that may be used to gain entry to a flight, pass through airport security, gain entry to an airline lounge, and other possible uses. The mobile wallet item 102 is a mobile document that may be received on a mobile device and viewed within a mobile wallet app, such as the "WALLET" app on IPHONE® devices available from APPLE, INC, of Cupertino, Calif. and other apps that perform similar functions to provide ready access to items such as credit cards, travel service boarding passes, loyalty cards, membership cards, event tickets, and the like. Regardless of the actual mobile wallet app that is used, the mobile wallet app may contain functionality natively or as augmented or extended in some embodiments or augmented with the functionality of one or more other apps in some embodiments to facilitate some of the various embodiments herein. In some embodiments, the mobile wallet item 102 is received and viewable within a specific mobile app, such as a mobile app of an airline, movie theater operator, sporting league, event venue, event ticket retailer, and other such apps. In some further embodiments, the mobile wallet item 102 may be viewed within more than one mobile app, within a document viewing app, within an image viewing app, within an email or text message, and the like.

The mobile wallet item 102 includes several elements, some of which may be dynamic. One element is the "GoFast Airlines" header or logo. There are also three other dynamic elements 104, 106, 108 of the mobile wallet item 102, although other mobile wallet items and other mobile documents may include only one dynamic element or many dynamic elements. The dynamic elements of the mobile wallet item include a barcode 104, flight information 106, and an indicator 108 of when the mobile wallet item 102, or one or more of the dynamic elements therein, was last updated. In some embodiments, the indicator 108 may not be visible, but instead utilized by an update process of a mobile wallet app to determine when to check for updates to the mobile wallet item 102, such as every fifteen minutes, every two hours, daily, or another period. The refresh period for the mobile wallet item 102 may be specified within a mobile wallet or other app used to view the mobile wallet item 102, within metadata 102M of the mobile wallet item, within metadata. 104M, 106M of one or more dynamic elements 104, 106, or multiple such locations. Regardless, the dynamic elements 104, 106 are data items that can change over time while the mobile wallet item 102 resides on a mobile device.

Mobile wallet items 102, such as travel boarding passes as illustrated or movie tickets, sporting event tickets, and the like, often involve underlying data that may change. Airport gate assignments, flight status, boarding times, sporting event start times and weather delays, seat assignments, theater complex theater assignments, and the like may change and static mobile wallet items are unable to accommodate such changes, thereby requiring new static mobile wallet items be issued and obtained or replace paper items be generated and provided. The various embodiments herein allow for the dynamic elements 104, 106 to be updated or for the entire mobile wallet item 102 to be updated. The updates may occur in different embodiments in different ways. For example, a mobile wallet app may include code that operates to refresh data of dynamic elements 104, 106 by retrieving updated data from one or more data sources as identified within metadata 102M, 104M, 106M of a mobile wallet item or as may be transmitted thereto. In other embodiments, one or more other apps may feed updated data to the mobile wallet app.

In some embodiments, metadata 102M, 104M, 106M underlies one or more of the mobile wallet item 102 and dynamic elements 104, 106. The metadata may define how the data is to be presented, link the data of the respective dynamic element to a callable application programming interface (API), web service, or other network location from which an update to the respective data may be requested, set the refresh period, and other purposes.

Figure 2:
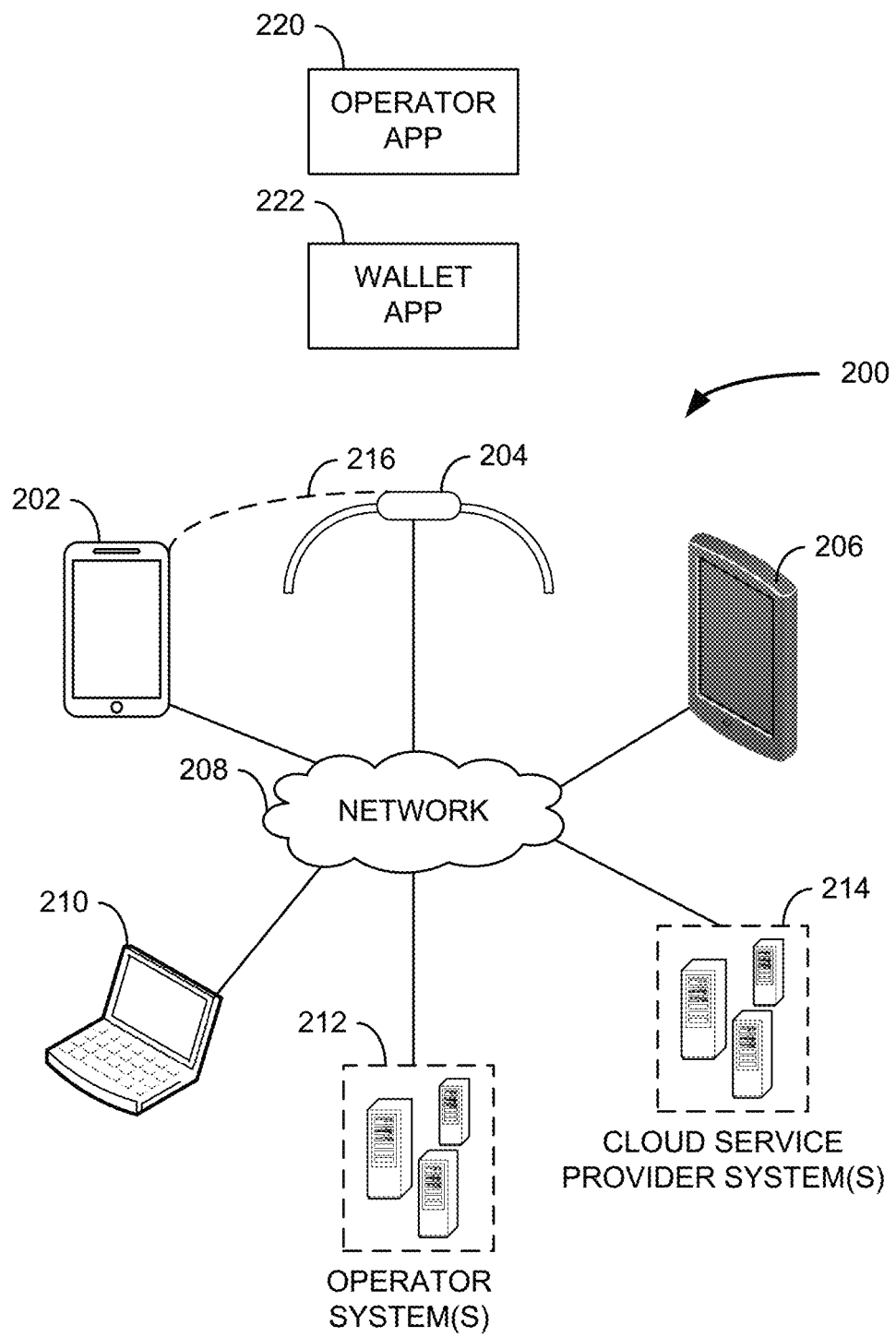
FIG. 2 is a logical block diagram of a system architecture, according to an example embodiment.

FIG. 2 is a logical block diagram of a system architecture 200, according to an example embodiment. The system architecture 200 includes an operator system 212, a cloud service provider system 214, and any number of consumer computing devices, such as personal computers 210 and mobile devices, such as smartphones 202, smartwatch 204, tablet 206, among others. These elements of the system architecture 200 are generally connected via one or more networks 208, which includes the Internet in many embodiments. Note that some mobile devices, such as the smartwatch 204, may no connect directly to the network 208 and instead connect via a BLUETOOTH® connection 216 to another device, such as the smartphone 202.

The operator system 212 is an example of a system implemented by an operator of a service or facility for which a dynamic mobile document, such as the mobile wallet item 102 of FIG. 1, is provided. The operator system 212 may therefore be a passenger flight reservation and operations system of an airline, a ticket purchasing and issuing system of a theater or venue operator, and the like The operator system 212 is therefore generally a system that maintains and generates data that is included in a mobile document. The cloud service provider system 214 is a system that provides mobile document generation and update services to the operator system 212 and to apps 220, 222 that are present on consumer devices. In some embodiments, the cloud service provider system 214 receives data from the operator system 212 to generate mobile documents and to transmit them to the consumer devices or return them to the operator system 212 to provide them to the consumer devices. The cloud service provider system 214 may also provide updates to dynamic mobile documents when requested by the consumer devices directly or indirectly via the operator system 212.

The consumer devices 220, 222 may include one or both of an operator app 220 and a wallet app 222. The operator app 220 is a mobile device app that communicates over the network 208 with one or both of the operator system 212 and the cloud service provider system to request and receive dynamic mobile documents and updates to to dynamic elements thereof. The operator app 220 may store and present dynamic mobile documents and also provide them to the wallet app 222. The wallet app 222 may receive dynamic mobile documents and store and present them. Dynamic mobile documents may also be received via email, text message, and other electronic means in some embodiments which may then be imported to one or both of the operator app 220 and the wallet app 222. The operator app 220 and the wallet app 222 may also request and receive dynamic mobile document updates from one or both of the operator system 212 and cloud service provider system 214. Note that some mobile documents may also include dynamic elements with data sourced from other network 208 locations, such as weather data which may be requested and received from a weather service provider (not illustrated), destination guide data sources (not illustrated), advertising content providers (not illustrated), and other data sources.

Although the operator system 212 and the cloud service provider system 214 are illustrated as separate and distinct systems, these systems may be combined into a single system in some embodiments. Further, in some embodiments, the cloud service provider system 214 is operated by a third-party and is a multi-tenant system providing services for a plurality of operator system 212. In other embodiments, the cloud service provider system 214 is operated by the same entity as the operator system 212.

Figure 3:
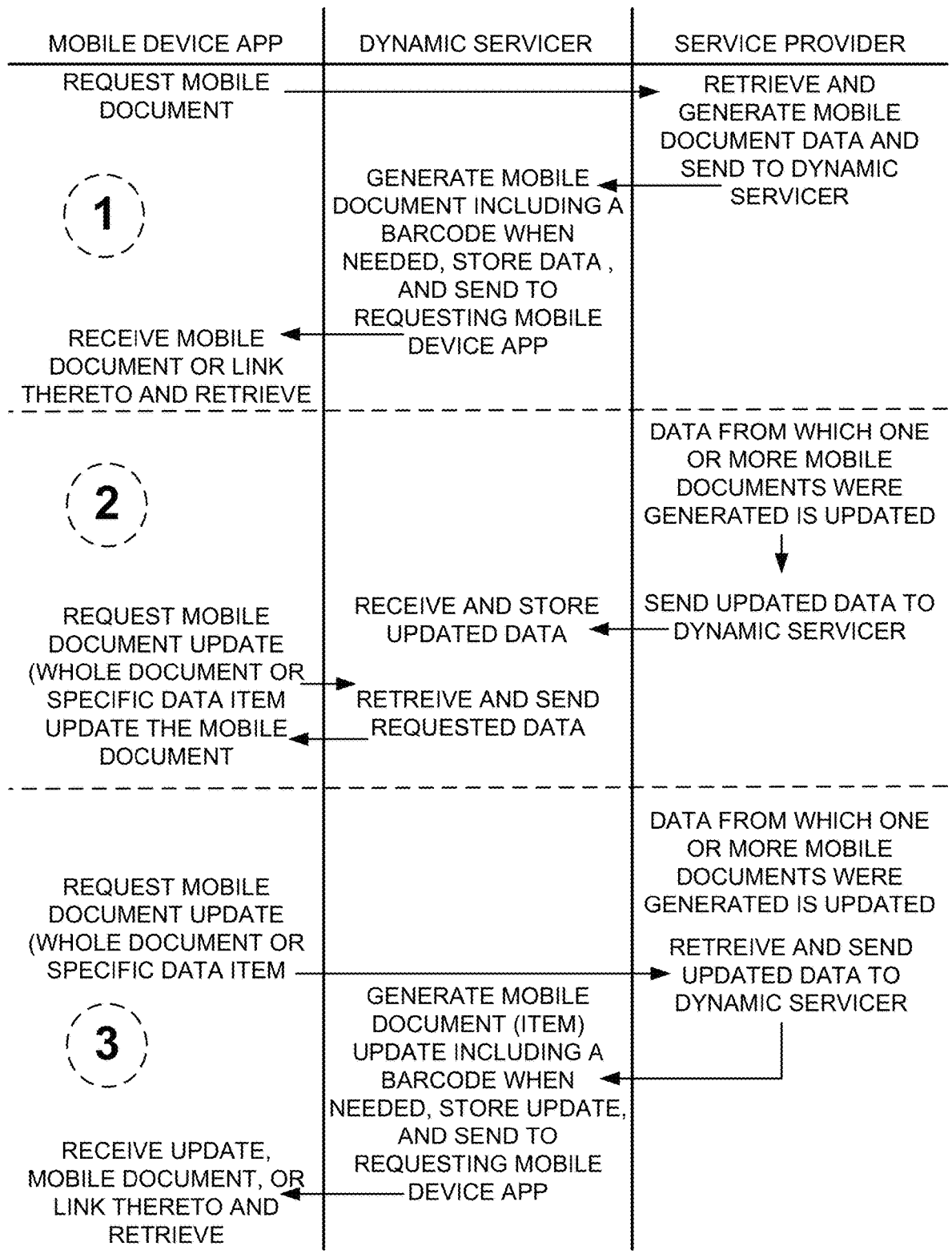
FIG. 3 includes three process flow diagrams, according to example embodiments.

FIG. 3 includes three process flow diagrams 1, 2, and 3, according to example embodiments. The first process flow diagram 1 illustrates an example embodiment of a process whereby a mobile device app, such as the operator app 220 of FIG. 2, requests a dynamic mobile document from a service provider, such as the operator system 212 of FIG. 2. The process flow diagram 2 of FIG. 3 illustrates an example embodiment of a process through which the mobile device app receives an update to a dynamic mobile document pushed by the service provider. The process of flow diagram 3 illustrates an example embodiment of a process through which a mobile device app requests, or pulls, an update to a dynamic mobile document from the service provider, although in other embodiments, the request may instead be sent to a dynamic servicer, such as the cloud service provider system 214 of FIG. 2.

The first process flow diagram 1, as mentioned above, 1 illustrates an example embodiment of a process whereby a mobile device app requests a dynamic mobile document from a service provider. The mobile device app sends a request for a mobile document to the service provider. The service provider then retrieves and generates data for the requested mobile document and sends the data to the dynamic server. The dynamic server then stores the mobile document data, generates the mobile document including a barcode (e.g., a Quick Response code, standard one-dimensional barcode) when needed for the document-type requested, and sends the generated mobile document to the requesting mobile device app. Note however that sending the mobile document to the mobile device app may include sending a link in an email, text message, in-app message, and the like or an image of the mobile document. In some embodiments, the dynamic servicer may return the generated mobile document to the service provider for relay back to the mobile device app.

The second process flow diagram 2, as mentioned above, illustrates an example embodiment of a process through which the mobile device app receives an update to a dynamic mobile document pushed by the service provider. Over time, data from which the mobile document was generated may change. For example, when the mobile document is an airline service boarding pass, the gate assignment for boarding of the flight may change on the service provider system. The service provider system will send the updated data to the dynamic servicer. The data sent to the dynamic servicer may not identify individual boarding passes to receive the update, but instead include sufficient data to identify the flight, such as a flight date, flight number, departure airport, and arrival airport plus a data representation of the newly assigned gate. As the dynamic servicer stores the data from which it generates the mobile documents are generated, the dynamic servicer is then able to identify to which mobile device app instances the mobile document has been sent within that data and then provide the update appropriately. Thus, when the dynamic servicer receives a data update from the service provider, the dynamic servicer stores the updated data, identifies to whom the update is to be provided when not specified in the received data, and generates and sends the update to one or more mobile devices apps, which as mentioned above may instead be text messages, emails, in-app messages, and the like.

The third process flow diagram 3 illustrates an example embodiment of a process through which a mobile device app requests, or pulls, an update to a dynamic mobile document from the service provider. This process flow begins with the mobile device app requesting an update to a mobile document, either as a whole or with regard to one or more specific dynamic elements included in the mobile document. The update request is sent to the service provider. The service provider then retrieves the requested data when the data has been updated since the mobile document was generated and sends the data to the dynamic servicer. The dynamic servicer then generates the mobile document update, stores the updated data, and sends the mobile document update to the mobile device app.

Figure 4:
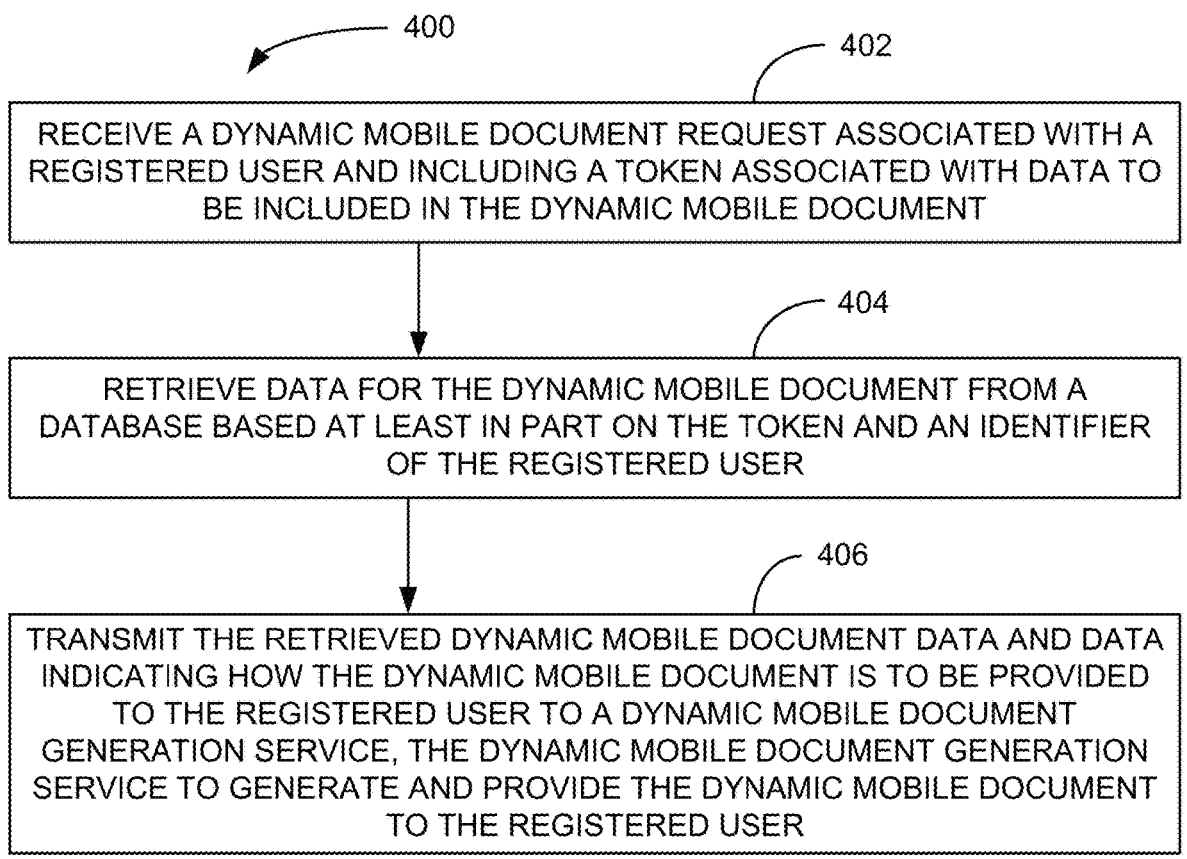
FIG. 4 is a block flow diagram of a method, according to an example embodiment.

FIG. 4 is a block flow diagram of a method 400, according to an example embodiment. The method 400 is an example of a method performed by an operator system or service provider system, such as operator system 212 of FIG. 2 or the furthest right column of FIG. 3.

In some embodiments, the method 400 includes receiving 400, via a network, a dynamic mobile document request associated with a registered user and including a token associated with data to be included in the dynamic mobile document. The method 400 further includes retrieving 404 data for the dynamic mobile document from a database based at least in part on the token and an identifier of the registered user. Retrieving 404 the data for the dynamic mobile document may also include generating and deriving data in some embodiments. The method 400 then continues by transmitting, via the network, the retrieved dynamic mobile document data and data indicating how the dynamic mobile document is to be provided to the registered user to a dynamic mobile document generation service. The dynamic mobile document generation service is a network accessible service in some embodiments, that generates and provides the dynamic mobile document to the registered user. Examples of the dynamic mobile document generation service include the cloud service provider system 214 of FIG. 2 and the middle column of FIG. 3.

In some embodiments of the method 400, at least one data item retrieved 404 from the database for the dynamic mobile document is subject to change. In some such embodiments, the method 400 further includes receiving, via the network from the dynamic mobile document generation service, a dynamic mobile document data update request including at least the token and retrieving at least a portion of the data for the dynamic mobile document from the database. The method 400 in such embodiments then transmits, via the network, at least the portion of the retrieved data for the dynamic mobile document to the dynamic mobile document generation service.

In some other embodiments of the method 400, at least one data item retrieved from the database for the dynamic mobile document is subject to change. The method 400 in such embodiments further includes identifying a change in the database to a data item included in at least one dynamic mobile document and retrieving the changed data and additional data to enable the dynamic mobile document generation service to identify all dynamic mobile documents impacted by the changed data. The method 400 in these embodiments then transmits the retrieved change data and the additional data via the network to the dynamic mobile document generation service to provide an update to a dynamic mobile document of at least one registered user.

In some embodiments of the method 400, the dynamic mobile document request is received 402 from a mobile device app of the registered user. Some such embodiments further include receiving, via the network from the mobile device app or a mobile wallet app of the registered user, a dynamic mobile document data update request including at least the token. These embodiments may then retrieve at least a portion of the data for the dynamic mobile document from the database and transmit, via the network, at least the portion of the retrieved data for the dynamic mobile document to the dynamic mobile document generation service to provide to the mobile device app or the mobile wallet app from which the request was received.

In some of these and other embodiments of the method 400, the dynamic mobile document is an airline boarding pass and the token is one or a combination of airline boarding pass data items that uniquely identify at least one of the airline boarding pass and a flight associated therewith. In other embodiments, the dynamic mobile document is a ticket for admittance to a movie, a sporting event, or other event and the token is one or a combination of data items that uniquely identify the dynamic mobile document.

Figure 5:
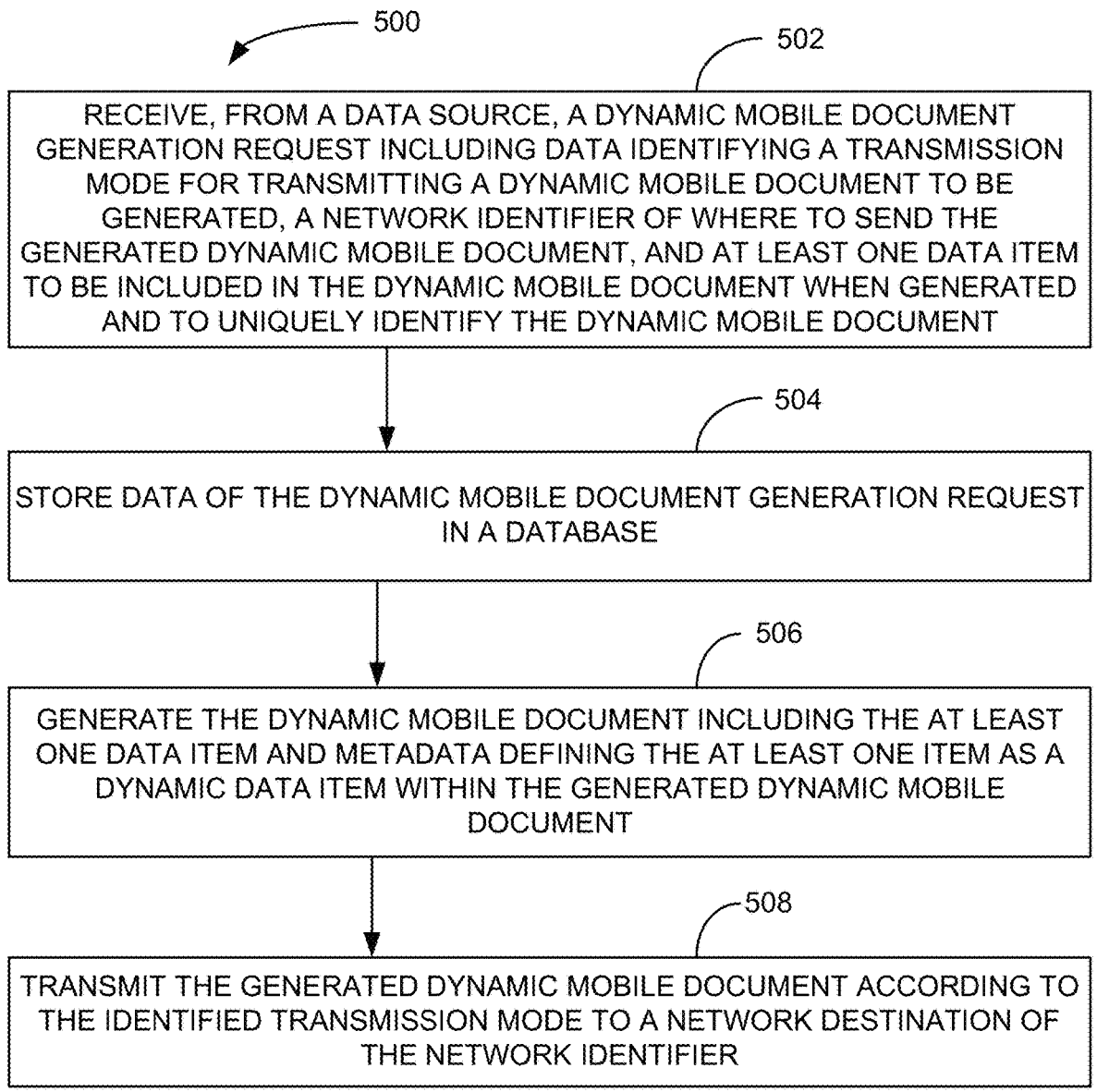
FIG. 5 is a block flow diagram of a method, according to an example embodiment.

FIG. 5 is a block flow diagram of a method 500, according to an example embodiment. The method 500 is an example of a method performed to generate dynamic mobile documents as may be performed, for example, on the cloud service provider system 214 of FIG. 2. The method 5000 includes receiving 502, via a network from a data source, a dynamic mobile document generation request including data identifying a transmission mode for transmitting a dynamic mobile document to be generated, a network identifier of where to send the generated dynamic mobile document, and at least one data item to be included in the dynamic mobile document when generated and to uniquely identify the dynamic mobile document. The method 500 further includes storing 504 data of the dynamic mobile document generation request in a database and generating 506 the dynamic mobile document including the at least one data item and metadata defining the at least one item as a dynamic data item within the generated dynamic mobile document. The method 500 continues by transmitting 508, via the network, the generated dynamic mobile document according to the identified transmission mode to a network destination of the network identifier.

In some embodiments of the method 500, the metadata defining the at least one data item as a dynamic data item further includes metadata associating the respective at least one data item with a network service that is callable from a mobile device via the network to retrieve an update of the respective at least one data item. The metadata in such embodiments informs a refresh process of a mobile wallet app or one or more other apps on the mobile device of a network location or process that is callable to obtain the updated data or from which updated data may be pushed to the mobile device. The updated data in some embodiments may not be retrieved, but rather an indication of the dynamic data becoming outdated indicating that the user should select a link to obtain a new mobile wallet item to including the updated data.

In some embodiments of the method 500, the data identifying the transmission mode identifies at least one of a text message or email that includes a Universal Resource Identifier from which the dynamic mobile document may be retrieved, a mobile device in-app message that includes the dynamic mobile document or a URI from which an app will retrieve the dynamic mobile document, an email that includes the dynamic mobile document therein or as an attachment. In some such embodiments, the dynamic mobile document is viewable within at least one of a mobile wallet app, a mobile app, a web browser, an image viewing app, and a document viewing app.

In some embodiments of the method 500, the dynamic mobile document includes at least one dynamic data element and a date-time stamp including date and time data of when each of the at least one dynamic data elements was last updated in the dynamic mobile document.

In some other embodiments, the method 500 includes receiving, via the network from the data source, such as the operator system 212 of FIG. 2, an update of at least one dynamic mobile document data item and data associating the at least one updated data item to at least one mobile document. The method 500 in such embodiments stores the updated at least one dynamic mobile document data item in the database in association with each of the at least one mobile documents. The storing of the updated at least one dynamic mobile document data item may include storing an indicator of each of the at least one updated dynamic mobile document items.

Another embodiment of the method 500 includes receiving, via the network from a mobile device, a dynamic mobile document update request including data uniquely identifying the dynamic mobile document to be updated and retrieving each of the at least one updated mobile document data items for the dynamic mobile document from the database based at least in part on the data uniquely identifying the dynamic mobile document to be updated. The method 500 in such embodiments then transmits, via the network, the retrieved at least one updated mobile document data item to the mobile device.

In another embodiment of the method 500, the received 502 dynamic mobile document generation request is a request to generate a dynamic mobile boarding pass for a transportation service segment. In such embodiments, the at least one data item to be included in the dynamic mobile document when generated and to uniquely identify the dynamic mobile document includes a transportation segment identifier, a boarding time, and a departure time. In some such embodiments, an update of the at least one dynamic mobile document data item includes an update with regard to at least one of the transportation segment identifier, the boarding time, and the departure time. In some such embodiments, the method 500 further includes, upon receipt of the update of the at least one of the transportation segment identifier, the boarding time, and the departure time, identifying all generated dynamic mobile documents for which data is stored in the database in association with the travel segment for which the update pertains. Such embodiments then generate and transmit, via the network, a dynamic mobile document update to the network destinations stored in the database to which the dynamic mobile documents were transmitted.

Figure 6:
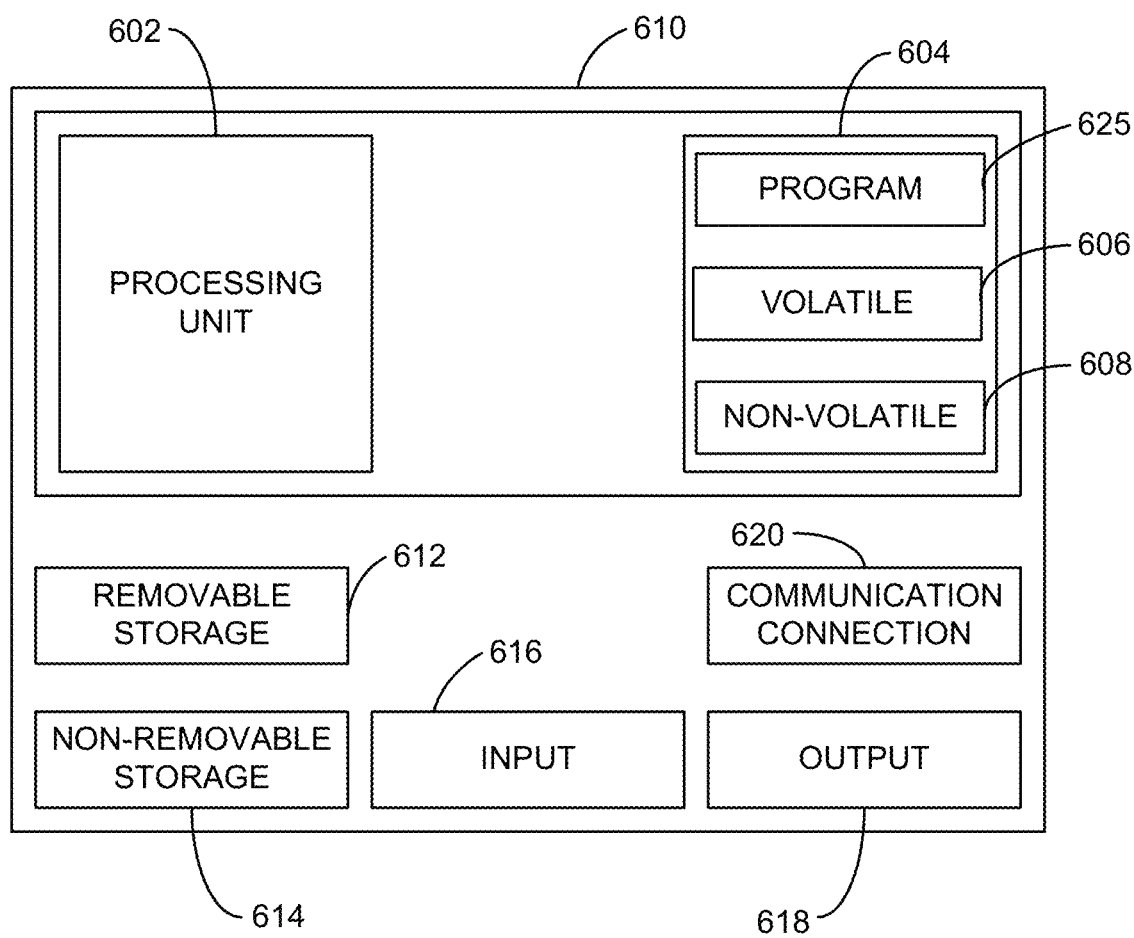
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a compute 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via, a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising: receiving, by a server from a mobile device app of a previously registered user via a network, a dynamic mobile document request associated with the registered user and including an identifier of the registered user and a token associated the dynamic mobile document data; retrieving, by the server, the dynamic mobile document data from a database based at least in part on the token and the identifier of the registered user, at least a portion of the data to be presented on a mobile device by the mobile device app of the registered user, wherein at least one retrieved data item is subject to change; transmitting, by the server via the network, the dynamic mobile document data from the database and data indicating how the dynamic mobile document is to he provided and presented to the registered user to a dynamic mobile document generation service, the dynamic mobile document generation service to generate and provide the dynamic mobile document to the registered user, receiving, by the server via the network from the dynamic mobile document generation service, a dynamic mobile document data update request including at least the token; retrieving by the server at least a portion of the data for the dynamic mobile document from the database; and transmitting, by the server via the network, at least the portion of the data for the dynamic mobile document retrieved from the database to the dynamic mobile document generation service.

2. The method of claim 1, wherein at least one data item retrieved from the database for the dynamic mobile document is subject to change, the method further comprising: identifying, by the server, a change in the database to a data item included in at least one dynamic mobile document; retrieving, by the server, the data item identified as changed in the database and additional data to provide to the dynamic mobile document generation service to identify all dynamic mobile documents impacted by the changed data; and transmitting, by the server, the data item identified as changed in the database and the additional data via the network to the dynamic mobile document generation service to provide an update to a dynamic mobile document of at least one registered user.

3. The method of claim 1, further comprising: receiving, via the network from the mobile device of the registered user, a dynamic mobile document data update request including at least the token; retrieving at least a portion of the data for the dynamic mobile document from the database; and transmitting, via the network, at least the portion of the data for the dynamic mobile document retrieved to the dynamic mobile document generation service to provide to the mobile device app or the mobile wallet app from which the dynamic mobile document request was received.

4. The method of claim 1, wherein the dynamic mobile document is an airline boarding pass and the token is one or combination of airline boarding pass data items that uniquely identify at least one of the airline boarding pass and a flight associated therewith.

\* \* \* \* \*